(12) United States Patent
Chabrol et al.

(10) Patent No.: US 8,300,250 B2
(45) Date of Patent: *Oct. 30, 2012

(54) METHOD AND SYSTEM FOR PRINT JOB PROCESSING

(75) Inventors: Alexandre Chabrol, Montpellier (FR); Benoit Granier, Vailhauques (FR); Aurelien Jarry, Montpellier (FR); Arnaud Mante, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 1225 days.

This patent is subject to a terminal disclaimer.

(21) Appl. No.: 12/107,973

(22) Filed: Apr. 23, 2008

(65) Prior Publication Data

US 2008/0291491 A1 Nov. 27, 2008

(30) Foreign Application Priority Data

May 18, 2007 (FR) .................................... 07108471

(51) Int. Cl.
| | |
|---|---|
| G06F 3/12 | (2006.01) |
| G06F 17/00 | (2006.01) |
| G06F 17/21 | (2006.01) |
| G06F 17/22 | (2006.01) |
| H04N 1/00 | (2006.01) |
| H04N 1/40 | (2006.01) |
| G06K 15/02 | (2006.01) |
| G06K 15/00 | (2006.01) |
| H03K 21/00 | (2006.01) |

(52) U.S. Cl. ........ 358/1.15; 358/1.2; 358/403; 358/468; 358/1.16; 358/434; 235/375; 377/44; 715/233; 715/262; 715/277

(58) Field of Classification Search .................. 358/1.2, 358/1.15; 705/301; 235/375; 715/233
See application file for complete search history.

(56) References Cited

U.S. PATENT DOCUMENTS

| | | | | |
|---|---|---|---|---|
| 5,860,066 A | * | 1/1999 | Rouse | ........................... 705/301 |
| 6,799,717 B2 | * | 10/2004 | Harris | ........................... 358/434 |
| 6,952,281 B1 | * | 10/2005 | Irons et al. | ................... 358/1.15 |
| 7,158,250 B2 | * | 1/2007 | Nagashima | ................... 358/1.15 |
| 7,536,638 B2 | * | 5/2009 | Barrus et al. | ................... 715/233 |
| 7,688,465 B2 | * | 3/2010 | Maeda | ........................... 358/1.15 |
| 7,703,002 B2 | * | 4/2010 | Barrus et al. | ................... 715/233 |
| 2002/0163653 A1 | * | 11/2002 | Struble et al. | ................... 358/1.2 |
| 2005/0094193 A1 | | 5/2005 | Oswald | |

FOREIGN PATENT DOCUMENTS

| | | | |
|---|---|---|---|
| JP | 2005107741 | | 4/2005 |
| JP | 2005107837 | | 4/2005 |
| JP | 2006103283 | * | 4/2006 |

* cited by examiner

Primary Examiner — Akwasi M Sarpong
(74) Attorney, Agent, or Firm — Yuanmin Cai

(57) ABSTRACT

Print jobs received at a printer are assigned a reference which is incorporated as a visible representation of the reference in the printed print job. When the user recovers the print job, the reusable print job addendum. is fed back into the printer, for reuse in later print jobs.

4 Claims, 11 Drawing Sheets

METHOD AND SYSTEM FOR PRINT JOB PROCESSING

CLAIM OF PRIORITY

This application claims priority to European Application No. 07108471.5 filed May 23, 2007, the entire content of which is incorporated by reference herein.

RELATED APPLICATIONS

This application is related to subject matter described and claimed in U.S. patent application Ser. No. 12/107861 entitled "Method and System for Print Job Processing" by the inventors of the instant application

FIELD OF THE INVENTION

The present invention relates to the field of printing, more particularly to document printing, and still more particularly to the handling of print jobs, in a network printing environment.

BACKGROUND OF THE INVENTION

It is increasingly common for a number of work stations to share a printer by means of a network. The shared printer or printers may be an appreciable distance from some work stations. Although high speed printers will generally be preferred for such shared situations, there will often be a substantial delay between the moment when a job is submitted for printing, and the moment when it is in fact available for collection. This situation leaves users with a choice of going early to fetch their completed print job and running the risk that the job is not in fact complete, so that the trip is wasted, or of waiting a long time, thereby interrupting the activity to which the print job is related and increasing the chance of the print job being misplaced whilst waiting for collection, and even being read by parties for whom it is not intended. A number of partial solutions to this set of problems have been proposed. Another issue is that a user may be confronted with a large number of different print jobs that have been printed recently, amongst which he must locate his own print job. A known partial solution to this problem is for the system to automatically add a cover page to each print job hardcopy identifying the user associated therewith, so that print jobs can be easily identified and distributed. A drawback of this approach is that it results in a large number of extra pages being printed, which are generally discarded as soon as the completed print job is recovered. A still further problem is that during the indeterminate period between a document being printed, and being recovered by the appropriate user, there is an opportunity for the document to be misplaced, or even misappropriated. It is possible for the user who requested the print to fail to recover the document within an appropriate time frame, or even to forget the document entirely.

The Patent application JP 2006103283 A2 entitled "Printing System" relates to a printing system for detecting a state that printed material is left in the paper discharge tray for a long time and can notify a user of the same. The system of patent publication uses RFID tag and RFID tag reading means for detecting printed material in paper discharge tray. The system of this publication comprises a RFID reading/writing part. At the time of the printing, the RFID reading writing part writes user identification information on a RFID tag of a printing paper supplied to the system. The user identification information can be used to identify a user who requests printing. After the completion of the printing, an RFID reading part monitors the printed material. If the printed material is detected by RFID reading part to be in the paper discharge tray after a predetermined interval of time, the user is sent a notification.

An obvious disadvantage of this approach is its dependence on the integration of RFID tags in standard print stock. Furthermore, it does not provide any teaching relevant to the issue of waste cover pages.

The Patent application JP 2005107741 A2 entitled "Printing job completion notification system for printing system" relates to a method and system for print job completion notification system. A user sends a printing job for printing to the system of patent publication using email. The system comprises a printer that comprises a printing job interpretation part. The printing job interpretation part receives and interprets the email and identifies the printing job. The printing job interpretation part further extracts an email address from the email. Thereafter, the printing job is executed by the printer. After completion of the print job the user is sent a notification on the email address.

Similarly the patent application JP 2005107837 A2 entitled "Printing job completion notification system" relates to a method and system for print job completion notification system. The system of patent publication comprises a computer system and a printing system. The computer system can be used for creating and sending a printing job. The computer system further adds an identification code along with the printing job. The printing system further comprises a storage device, a printing job interpretation part and a notification processing part. The storage device stores a computer identifier and a corresponding address. The computer identifier can be used for identifying a computer system and a notification destination can be used to send notifications. A user sends a first printing job to the printing system, thereafter, the printing job interpretation part identifies a first computer identifier and a first identification code from the first printing job. After printing of the first printing job, the notification processing part identifies a first notification destination from the storage device using the first computer identifier. Thereafter, a notification is sent to the computer system for completion of the first printing job.

Again, the patent application US 20050094193 A1 entitled "Print driver system and method for print job notification" relates to a method and system for digital document processing. The method comprises accepting a document for printing and thereafter, presenting a user interface for accepting print job commands. The print job commands can, for example, be selection of a printer etc. The method further comprises presenting a user interface for receiving notification commands. The notification commands can, for example, be an email address for receiving notifications. After receiving the notification commands, the document is sent for printing. The method further comprises sending a print job notification. The print job notification can, for example, include printing job completion notification, an error notification etc.

While this approach may lessen the tendency for users to delay recovering their documents, it will not be of any assistance in helping them identify their print job, or ensuring that it is not left for an unduly long period.

SUMMARY OF THE INVENTION

According to the present invention there is provided a method of processing a print job according to the appended independent claim 1, a computer program according to the appended independent claim 14, a computer readable medium according to the appended independent claim 15, a system according to the appended independent claim 16 and a printer according to the appended independent claim 17. Preferred embodiments are defined in the appended dependent claims.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which:

FIG. 2b shows details of the hardware configuration suitable for implementing a first embodiment of the invention in an intermediate phase following the initial phase described with reference to FIG. 2a;

FIG. 4b shows details of the hardware configuration suitable for implementing a third embodiment of the invention in an intermediate phase following the initial phase described with reference to FIG. 4a;

DETAILED DESCRIPTION

Figure 1:
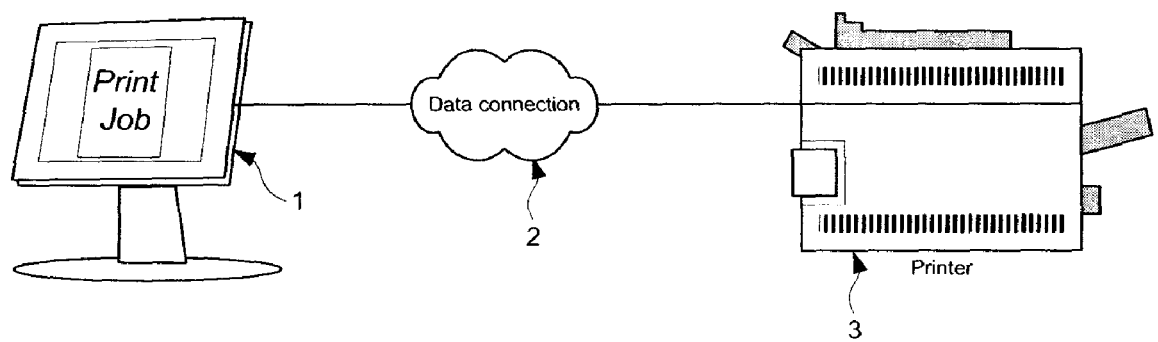
FIG. 1 shows a hardware configuration suitable for implementing embodiments of the invention.

FIG. 1 shows a hardware configuration suitable for implementing embodiments of the invention. As shown in FIG. 1 there is provided a requesting entity 1, a data connection 2 and a printer 3.

In the following description, the expression "print job" may be used to refer to a particular task assigned to the printer by a requesting entity, at any stage of the printing process, i.e. in electronic form, or in printed, hardcopy form. A print job may become associated with further components during the printing process, for example by action of the printer itself, which components may thereafter be considered as forming an integral part of the print job, or not, as appropriate. The expression "completed print job" may be used to refer to the print job in its final form incorporating any such further components.

The requesting entity may be for example a user workstation, or any other device capable of initiating a print job by emitting print job data. The data connection may comprise any electronic means for relaying data between the requesting entity and the printer. According to certain embodiments the data connection is a data network such as an Ethernet network, although any communications protocol may equally be used, for example Infiniband, IPX, AppleTalk, NETBEUI or TCP/IP based networks.

The printer may be any device capable of forming patterns on sheet media, for example by thermal, inkjet, laser or other means. The media are not limited to paper, but may also include any other printable medium such as envelopes, business cards, transparencies, optical discs etc. Where the following embodiments refer to a paper handling mechanism, it will be appreciated that the functions assigned thereto may be accomplished by similar mechanisms adapted as a function of the medium in question.

Certain embodiments call for the emission of notifications. Such notifications may be of any kind—in text, by audio means etc. They may be transmitted by means of any data connection as described above, for example in the form of an email or instant messaging communication, or by SMS, voicemail or any other suitable means.

In accordance with certain embodiments, when the requesting entity 1 submits print job data with the data connection 2, for example by means of a user of the requesting entity manipulating a print instruction dialog in the user interface of the requesting entity, or otherwise, the print job data is received from a requesting entity by the printer 3, and proceeds to assign a reference to the print job defined by the data. In any case there is carried out a step of retrieving a reusable print job addendum bearing a representation of the reference from a reusable print job addendum reservoir (32). This reference makes it possible to uniquely identify the completed print job from other print jobs that the printer may be handling or recently have handled, or that may be present on the data connection, or have been submitted by the requesting entity. According to certain embodiments the reference may incorporate a serial number. The reference may also incorporate a reference to the requesting entity or the user of the requesting entity. The reference may incorporate a user name, or a reference to the network location of the originating entity, or any other information that may assist a user in correctly identifying a completed print job as belonging to him. The representation may be in visible form such as for example in a human readable form, and/or in a machine readable form. The representation may comprise a bar code, and/or alphanumeric or similar human readable characters, or an RFID or other electronically detectable representation. The reference may be notified to the requesting entity, in particular when it is in a visible or human readable form. A user may then retrieve the completed print job using the representation thereon as a means to identify the particular print job in question. The printer 3 proceeds to print a print job hardcopy on the basis of the print job data, and furthermore to incorporate the reusable print job addendum thus retrieved with the print job hardcopy to produce a completed print job.

The reusable print job addendum may be scanned, after completion of the print job for example using an optical scanner associated with the printer in the case where the representation is visible or other scanner suitable for reading whatever format of representation is used. The expression scanner or scanning as used hereafter is intended to cover all such arrangements, although in preferred embodiments an optical scanner of the kind often incorporated in or associated with a printer is used. This step of scanning is preferably initiated by a user on recovering the print job. The reusable print job addendum is then returned to the reusable print job addendum reservoir (32).

By means of this approach it is possible to reduce the waste of paper that is often used to separate print job hardcopies and then simply discarded.

Figure 2A:
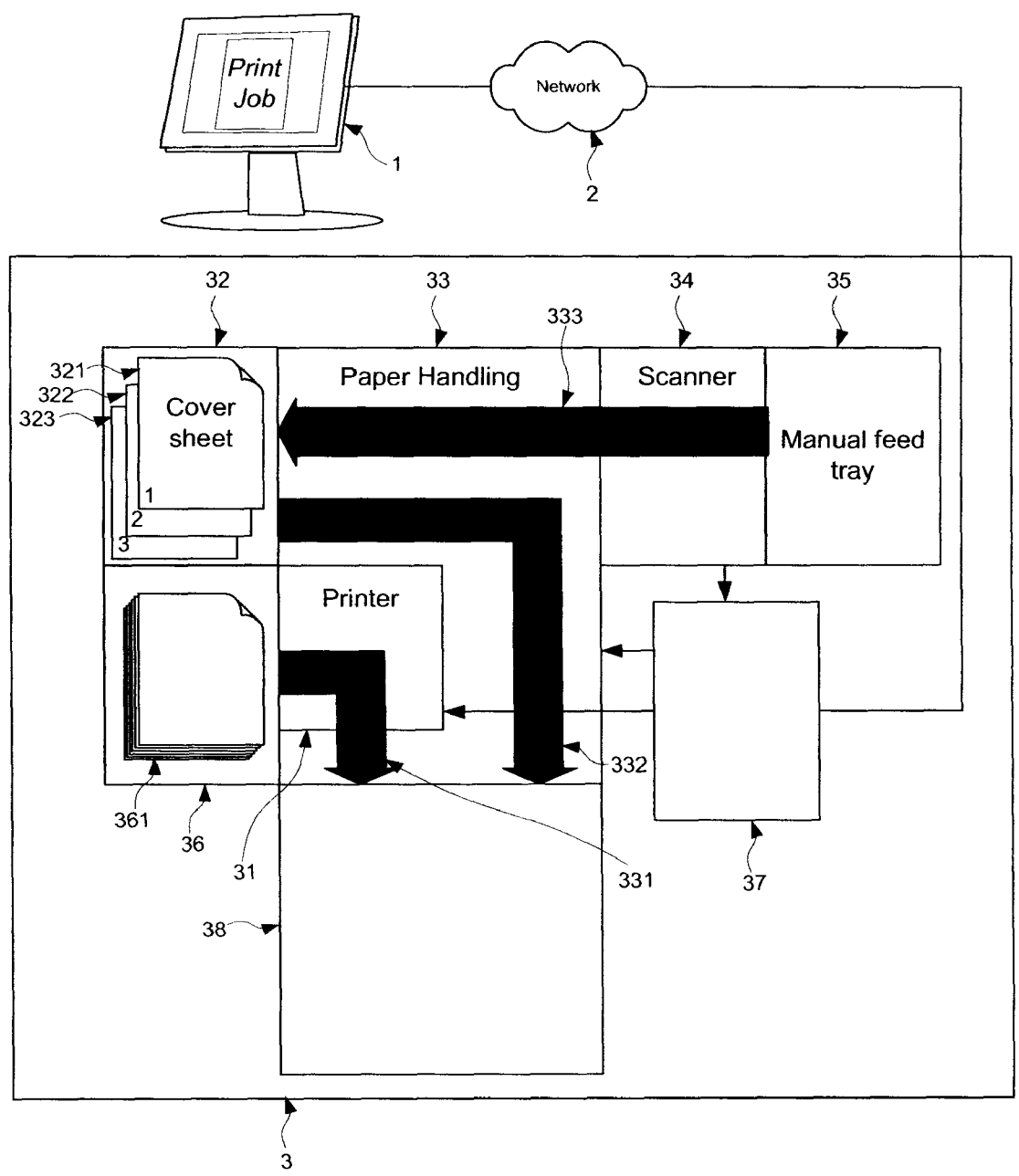
FIG. 2a shows details of the hardware configuration suitable for implementing a first embodiment of the invention in an initial phase.

FIG. 2*a* shows details of the hardware configuration suitable for implementing a first embodiment of the invention in an initial phase. In particular, as shown in FIG. 2*a* the printer 3 comprises an image formation unit 31, a first paper tray 32, a second paper tray 36, paper handling mechanism 33, a scanner 34, a manual feed tray 35, a control unit 37 and an output tray 38. While the printer described is typical of network printers, the skilled person will appreciate that a very wide range of variations on this configuration are possible. In particular, a number of functions may be provided by physically separate units or modules, for example by separating the scanner from the other components. The control unit may be a processor integrated in the printer, or may be a printer server or other data processing device suitable for controlling the various components of the printer. More or fewer paper trays, feed trays and output trays may be provided. the paper handling mechanism may be more or less sophisticated, and may be separated into a number of modules. As shown, the paper handling module is capable of conveying pages from the first paper tray 32 to the output tray 38, from the second paper tray 36 via the image forming unit 31 to the output tray 38, and from the manual feed tray 35 via the scanner 34 to the first paper tray 32. Further flow paths may be provided in accordance with other printer functions.

When print job data is submitted by the requesting entity 1, the relevant data are received by the processor 37, which instructs the paper handling mechanism and image forming unit to implement the various steps as described hereafter. In particular, the paper handling mechanism draws paper from the second paper tray 36, and through the image forming unit 31 and into the output tray 38, substantially as known from conventional printers. In certain embodiments the selection of a reference and its assignment to a particular print job may also be wholly or partially carried out by the processor 37.

In accordance with a first embodiment the part of said print job incorporating said reference is a reusable print job addendum. The reusable print job addendum is preferably a flexible sheet of dimensions suitable for manipulation by a printer's paper handling mechanism. It may simply comprise a sheet of paper, or preferably a sheet formed of a more robust material such as a plastic sheet, plastic based or similar "untearable paper" etc. As shown in FIG. 2*a* one or more such reusable components 321, 322, 323 are stored in said first paper tray, or reusable print job addendum reservoir 32. These reusable components are pre-printed with respective visual representations of references as described above.

Figure 2B:
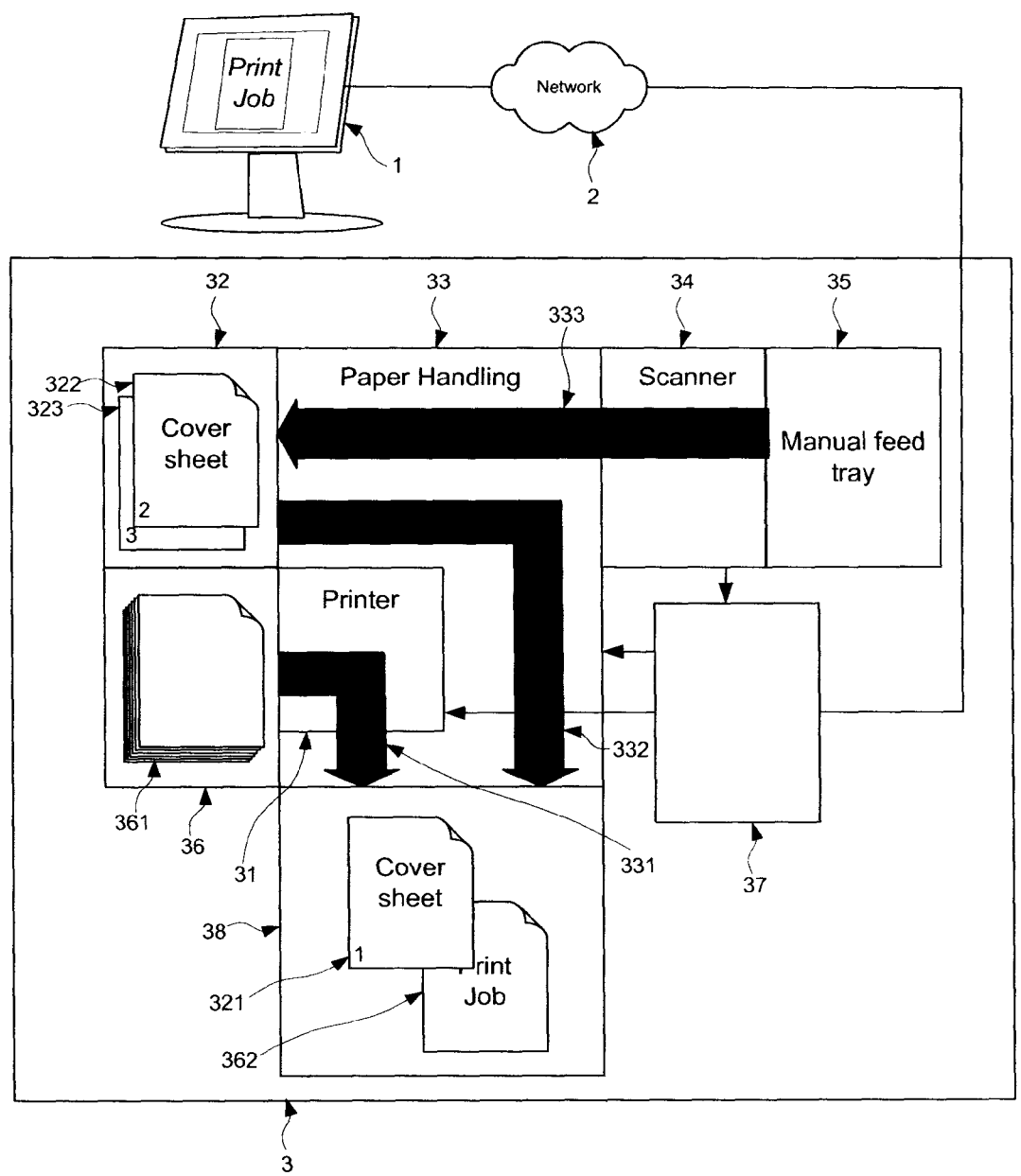

FIG. 2*b* shows details of the hardware configuration suitable for implementing a first embodiment of the invention in an intermediate phase following the initial phase described with reference to FIG. 2*a*. As shown the printer comprises a paper handling mechanism 33 which provides for a number of different paper flow paths 331, 332, 333. When a print job hardcopy is printed, via paper flow path 331 as described above, in accordance with the first embodiment a reusable print job addendum 321 bearing a representation of said reference is retrieved from the reusable print job addendum reservoir 32, and added to the print job hardcopy by the action of the paper handling mechanism 33 via paper flow path 332, so that the print job hardcopy and the reusable print job addendum are ejected together into the output tray 38. A notification of the reference is supplied to the requesting entity. The reference may be displayed or otherwise presented to a user of the requesting entity, so that the user may then correctly identify the completed print job in question waiting in the output tray 38.

By scanning the reusable print job addendum back into the printer it becomes possible to detect the moment at which a print job hardcopy is recovered.

Figure 2C:
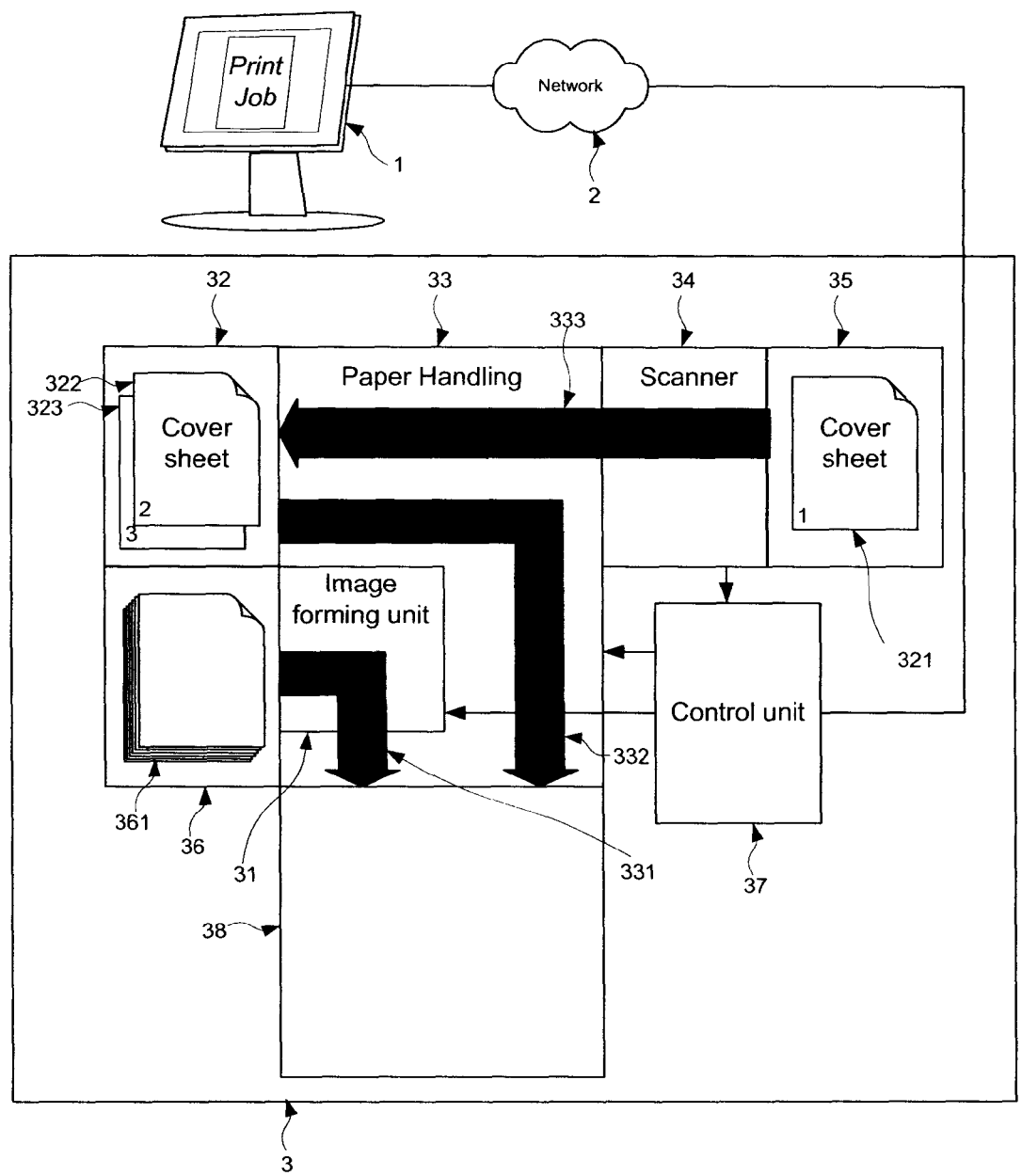
FIG. 2c shows details of the hardware configuration suitable for implementing a first embodiment of the invention in a final phase following the intermediate phase described with reference to FIG. 2b.

FIG. 2*c* shows details of the hardware configuration suitable for implementing a first embodiment of the invention in a final phase following the intermediate phase described with reference to FIG. 2*b*. In accordance with the first embodiment, a user recovering the completed print job from the output tray is required to scan the reusable print job addendum. To do this, the reusable print job addendum is placed in the manual feed tray 35, and by the action of the paper handling mechanism 33 is scanned by the scanner 34 and returned to the first paper tray or reusable print job addendum reservoir 32.

Preferably, in a case where there are provided a plurality of reusable print job addenda each bearing a different respective representation of a reference, the processor 37 is adapted to track which reusable print job addenda are present in the reusable print job addendum reservoir 32 at a given moment. The processor can keep track of the reusable print job addenda that have been checked out of the reusable print job addendum reservoir 32. Meanwhile, it is the fact that the reusable print job addendum is scanned when each completed print job is collected, and the reusable print job addendum is then returned to the reusable print job addendum reservoir 32 that enables the processor to check reusable print job addenda back in again for later reuse. for example using an optical scanner associated with the printer in the case where the representation is visible. Where this is the case, the assignment of a reference to a particular print job is carried out with reference to the print job addenda present in said reusable print job addendum reservoir 32 at the time in question.

According to certain embodiments there is provided a predefined set of reusable print job addenda, from which a reusable print job addendum is selected for each new print job. In this approach it may be preferable to use references that are not specific to particular users or originating entities, since otherwise it may be necessary to provide at least one reusable print job addendum for every possible user or originating entity, possibly more in view of the possibility of the same user initiating a number of print jobs in short succession. Such non specific references may include arbitrary alphanumeric strings, simple serial numbers and so on. One may envisage embodiments where the reference is the colour of the sheet itself, or an image printed on the sheet. Another advantage of this approach is that the printer can simply use the top reusable print job addendum from the stack in the reusable print job addendum reservoir 32, without any need to sort the contents of the paper tray or to select a particular reusable print job addendum for a particular print job.

On the other hand, it may be desirable to include more user specific data in the reference, such as a user name, personal name, network ID, network address of the originating entity, etc. Under these circumstances, rather than providing sufficient reusable print job addenda to allow every user to make multiple prints under his own name, one solution would be to provide a set of user unique reusable print job addenda, and a set of generic print job addenda similar to those described in the preceding paragraph to provide for situations where a user specific reusable print job addendum is not available, for example because no user specific reusable print job addenda has been provided e.g. for a new user, or because the same user has initiated a number of consecutive print jobs and exhausted his stock of user specific reusable print job addenda. In such cases where no user specific print job addendum was available, a generic reusable print job addendum could be assigned as described in the preceding paragraph. An alternative solution would be to enable the printer to generate reusable print job addenda on the fly, that is to draw a blank reusable component from a reservoir and to print details on it to satisfy a present requirement for example by means of the image forming unit 31, e.g. for a particular user. The newly generated reusable print job addendum would of course be scanned and returned to the said reusable print job addendum reservoir 32 in the usual manner, and thereafter reused whenever needed by that same user. A result of this approach may be a tendency for the number of reusable print job addenda in the reusable print job addendum reservoir 32 to increase over time, to a point where the number of reusable print job addenda may exceed the capacity of the reusable print job addendum reservoir 32, or otherwise become impractical. One solution for this problem may be for the control unit 37 to maintain a record of the usage of different reusable print job addenda so as to allow for a purge of the less useful reusable print job addenda. Another consideration in providing for user specific reusable print job addenda is the need for the printer to successfully retrieve the appropriate print job addendum for a particular print job. This may call on the control unit 37 to maintain a record of the position of the various print job addenda defined in the system, and their position either in the reusable print job addendum reservoir 32 or elsewhere. Furthermore the printer must provide the mechanical means to select a specific reusable print job addendum, either by selection from a large number of reusable print job addenda in a common reusable print job addendum reservoir, or by dividing the reusable print job addendum reservoir 32 into a number of sub reservoirs each containing a particular reusable print job addendum, or otherwise.

Even in a case where a set of generic reusable print job addenda is used, it may be advantageous to enable the printer to generate such print job addenda itself from blank stock.

The reference may also be present on the reusable print component in other formats for example those not intended for optical reading. Sheets may for example also include a representation of the reference in Braille or the like, enabling visually impaired users to successfully retrieve print jobs.

According to a second embodiment, which may be realised in a system similar to that described above with respect to FIGS. 2*a*, 2*b* and 2*c*, the delay between the steps of printing a print job incorporating a representation of the reference and of scanning the reusable print job addendum of the reference is monitored, and in a case where the delay exceeds a predetermined threshold carrying out a further notification step. This further notification may comprise notifying the requesting entity, in other words in issuing a reminder that the completed print job is still waiting to be collected. The further notification may still further comprise notifying another user or entity altogether, for example a hierarchal superior to the user of the requesting entity, an administrative assistant to the user of the requesting entity, etc.

Figure 3:
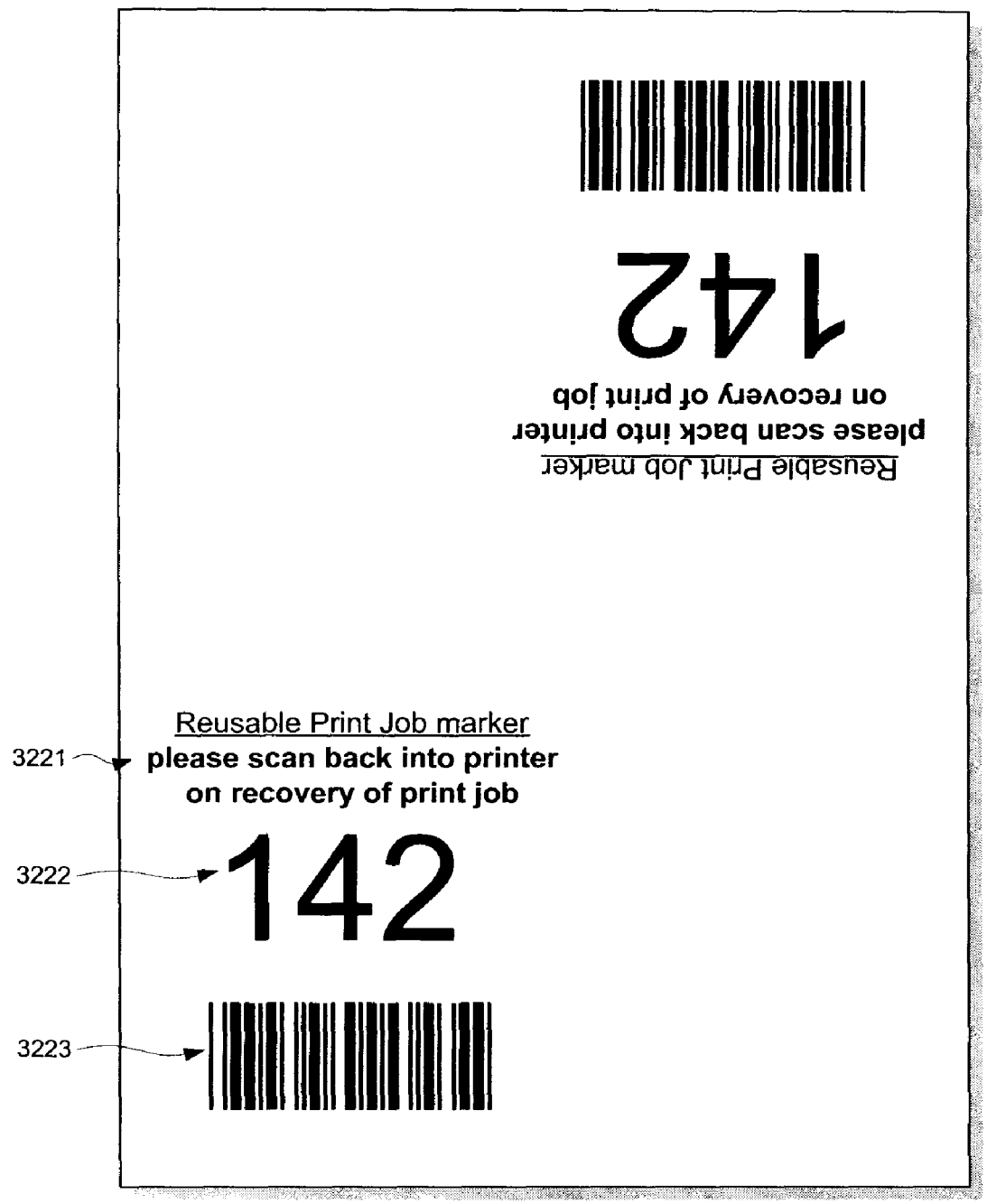
FIG. 3 shows a reusable print job addendum as described with respect to FIGS. 2a to 2c.

FIG. 3 shows a reusable print job addendum as described with respect to FIGS. 2*a* to 2*c*. As shown in figure there is shown a flexible sheet of standard format corresponding to the principle format handled by the printer. Common formats include ISO A4 and US Letter, but the reusable print job addendum can clearly be of any size as appropriate to the role of the printer in question. As shown a number of different sets of characters are printed or otherwise disposed on the reusable print job addendum. In particular there is provided a text message 3221 to users providing instructions as to the proper usage of the reusable print job addendum, in this case the legend "Reusable Print Job marker please scan back into printer on recovery of print job". There is further provided a human readable representation of a reference 3222, which in the shown example is the reference number "142". There is still further provided a machine readable representation 3223 of the same reference, in this case in the form of a bar code according to the 3 of 9 encoding standard, corresponding to the characters "*142*". As shown, the three elements 3221, 3222, 3223 are grouped together in one corner of the reusable print job addendum, with the lines of text running parallel to the shorter edge of the sheet. Identical characters are provided in the opposite corner but inverted with respect to the first group of characters. The sheet may be printed in the same manner on both sides. Such a distribution may facilitate the task of scanning the sheet to identify the reference, since regardless of the orientation of the reusable print job addendum as it arrives in the output tray or as it is fed into the scanner, a copy of the text data will be present in the same position with the same orientation. Similarly, this approach obviates any need to manage the orientation of reusable print job addenda in the paper tray 32.

Figure 4A:
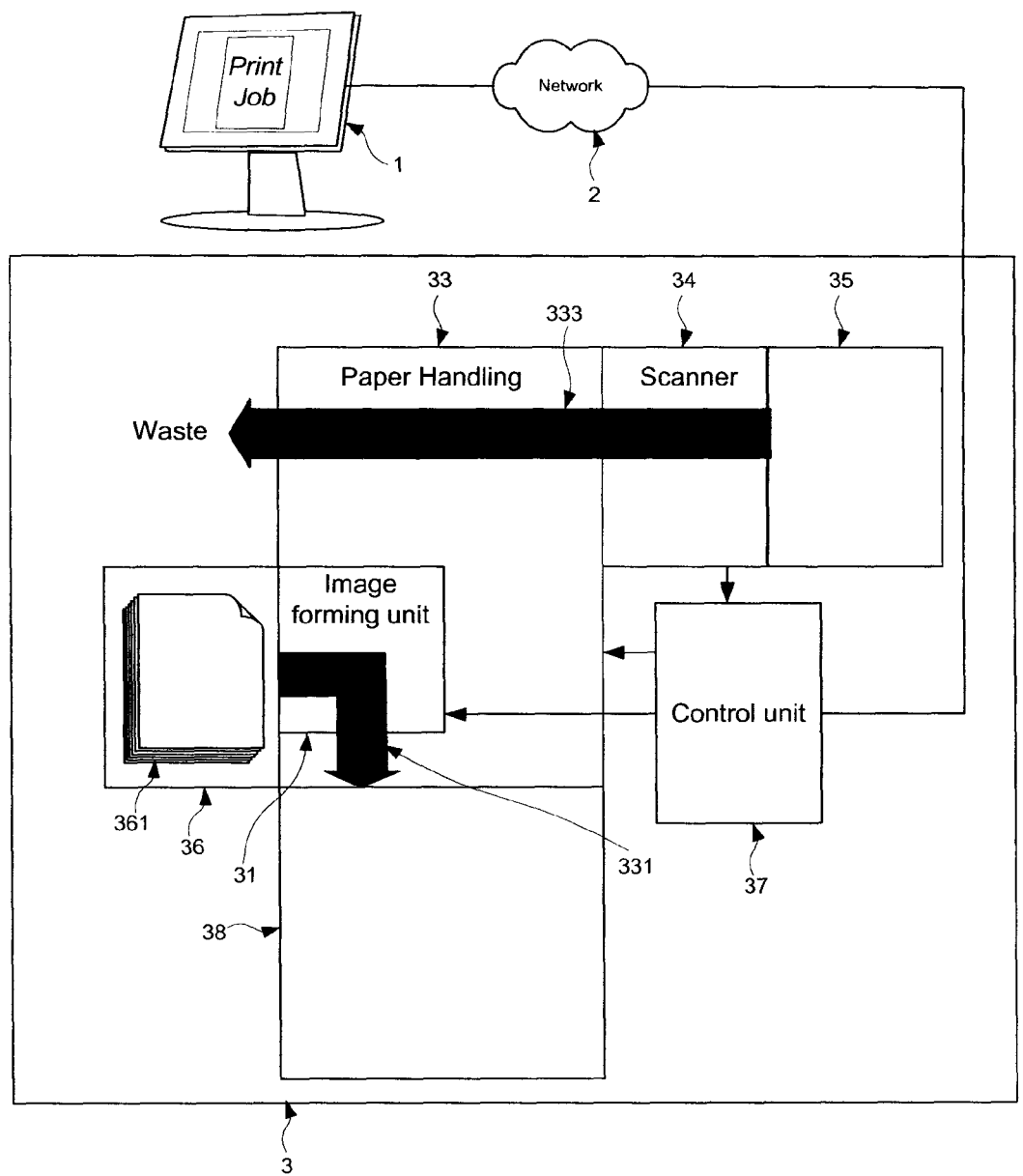
FIG. 4a shows details of the hardware configuration suitable for implementing a third embodiment of the invention in an initial phase.
Figure 4B:
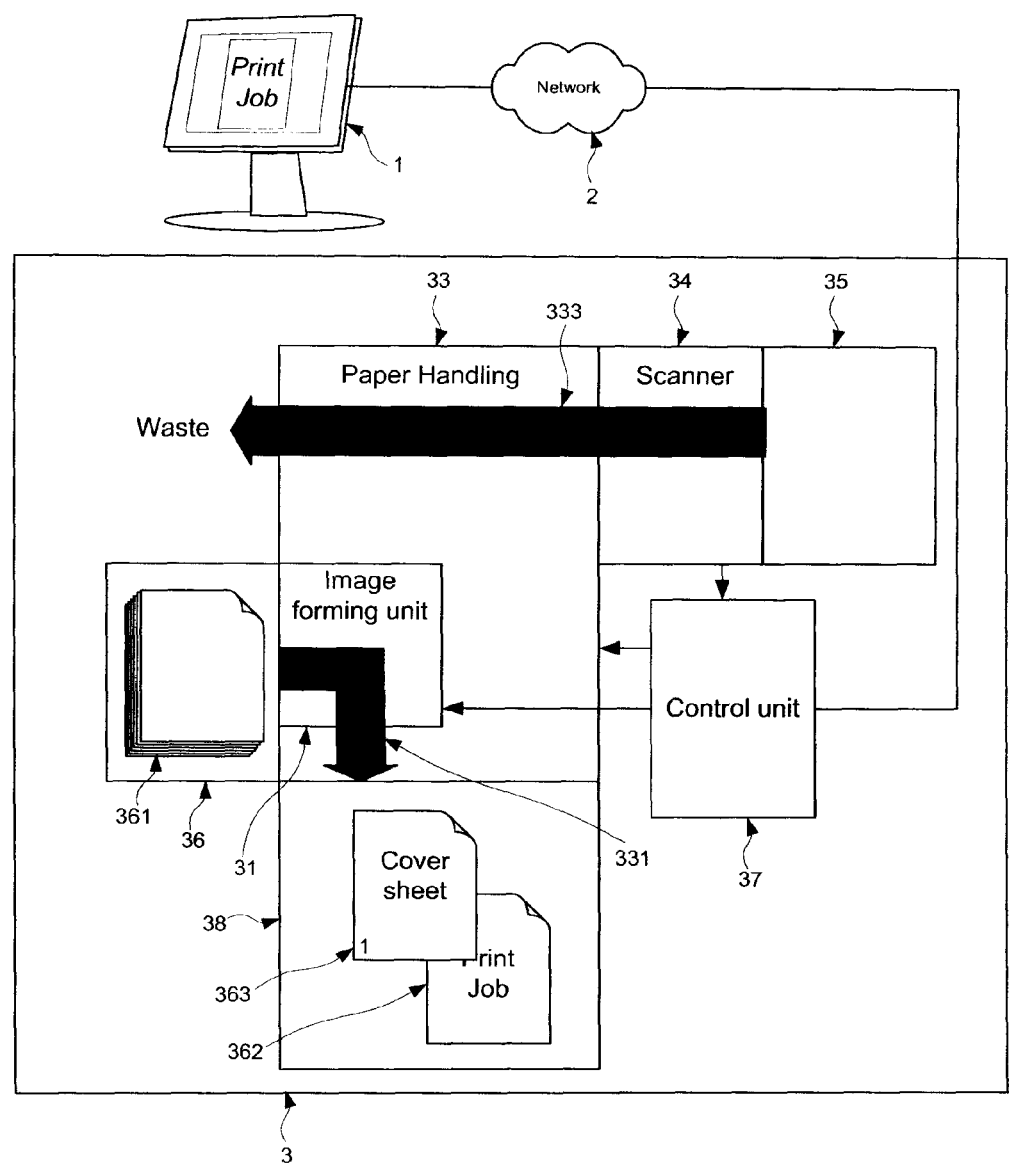
Figure 4C:
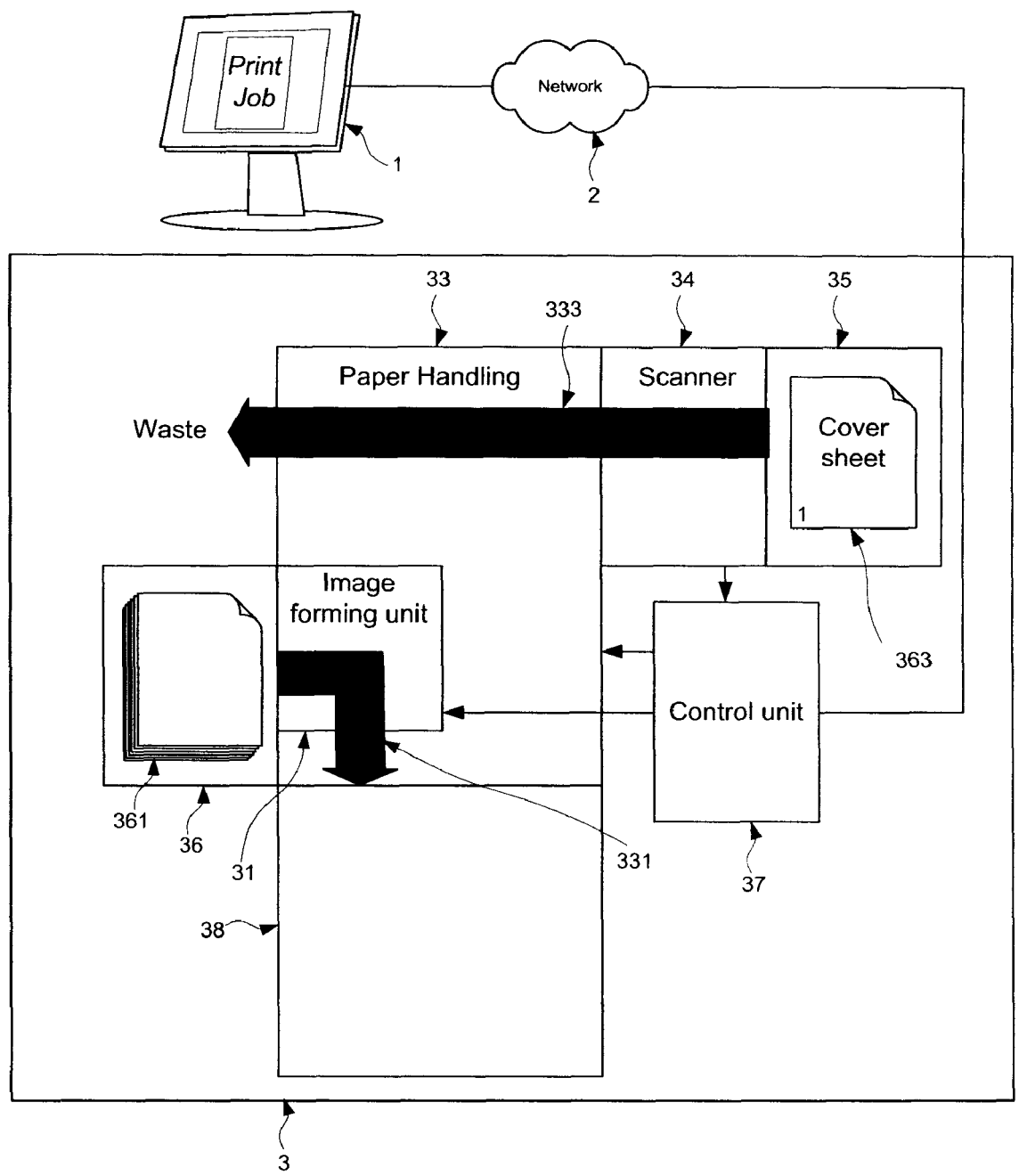
FIG. 4c shows details of the hardware configuration suitable for implementing a third embodiment of the invention in and final phase following the intermediate phase described with reference to FIG. 4b.

FIGS. 4*a* to 4*c* show a third embodiment of the invention.

FIG. 4*a* shows details of the hardware configuration suitable for implementing a third embodiment of the invention in an initial phase. In particular, as shown in FIG. 4*a* the printer 3 comprises an image formation unit 31, a second paper tray 36, a paper handling mechanism 33, a scanner 34, a manual feed tray 35, a control unit 37 and an output tray 38. While the printer described is typical of network printers, the skilled person will appreciate that a very wide range of variations on this configuration are possible. In particular, a number of functions may be provided by physically separate units or modules, for example by separating the scanner from the other components. The control unit may be a processor integrated in the printer, or may be a printer server or other data processing devices suitable for controlling the various components of the printer. More or fewer paper trays, feed trays and output trays may be provided. The paper handling mechanism may be more or less sophisticated, and may be separated into a number of modules. As shown, the paper handling module is capable of conveying pages from the second paper tray 36 via the image forming unit 31 to the output tray 38, and from the manual feed tray 35 via the scanner 34 to a waste outlet. Further flow paths may be provided in accordance with other printer functions.

When print job data is submitted by the requesting entity 1, the relevant data are received by the processor 37, which instructs the paper handling mechanism and image forming unit to implement the various steps as described hereafter. In particular, the paper handling mechanism draws paper from the second paper tray 36, and through the image forming unit 31 and into the output tray 38, substantially as known from conventional printers. In certain embodiments the selection of a reference and its assignment to a particular print job may also be wholly or partially carried out by the processor 37.

In accordance with the third embodiment the part of said completed print job incorporating the reference is a disposable print job addendum, which may comprise an extra sheet of material similar to that used for the main part of the print job hardcopy, which is not reused as described with respect to the first embodiment. The disposable print job addendum 363 is preferably similar or identical to the material used for the remainder of the print job hardcopy, and still more preferably is identical material drawn from the same source 36. In any case, it is a flexible sheet of dimensions suitable for manipulation by a printer's paper handling mechanisms.

FIG. 4*b* shows details of the hardware configuration suitable for implementing a first embodiment of the invention in an intermediate phase following the initial phase described with reference to FIG. 4*a*. When a print job hardcopy is printed, as described above, in accordance with the third embodiment a disposable print job addendum 363 bearing a representation of a reference is printed by the image forming unit 31 is printed and fed to the output tray 38 together with print job hardcopy 362 by the action of the paper handling mechanism, so that the print job and the disposable print job addendum are ejected together into the output tray 38. A notification of the reference is supplied to the requesting entity. The reference may be displayed or otherwise presented to a user of the requesting entity, so that the user may then correctly identify the completed print job in question waiting in the output tray 37.

FIG. 4*c* shows details of the hardware configuration suitable for implementing a third embodiment of the invention in a final phase following the intermediate phase described with reference to FIG. 4*b*. In accordance with the third embodiment, a user recovering the completed print job from the output tray 38 is required to scan the part of said print job incorporating said representation, that is, the disposable print job addendum 363. To do this, the disposable print job addendum 363 is placed in the manual feed tray 35, and by the action of the paper handling mechanism 33 is scanned by the scanner 34 and ejected via a waste outlet.

The disposable print job addendum 363 may correspond substantially in appearance and content to that described above with reference to FIG. 3, with suitably amended text message.

The delay between the steps of printing a completed print job incorporating a representation of the reference and of scanning the part of the completed print job incorporating the representation of the reference is monitored, and in a case where the delay exceeds a predetermined threshold a further notification step is carried out. This further notification may comprise notifying the requesting entity, in other words in issuing a reminder that the completed print job is still waiting to be collected. The further notification may still further comprise notifying another user or entity altogether, for example a hierarchal superior to the user of the requesting entity, an administrative assistant superior to the user of the requesting entity, etc.

Figure 5:
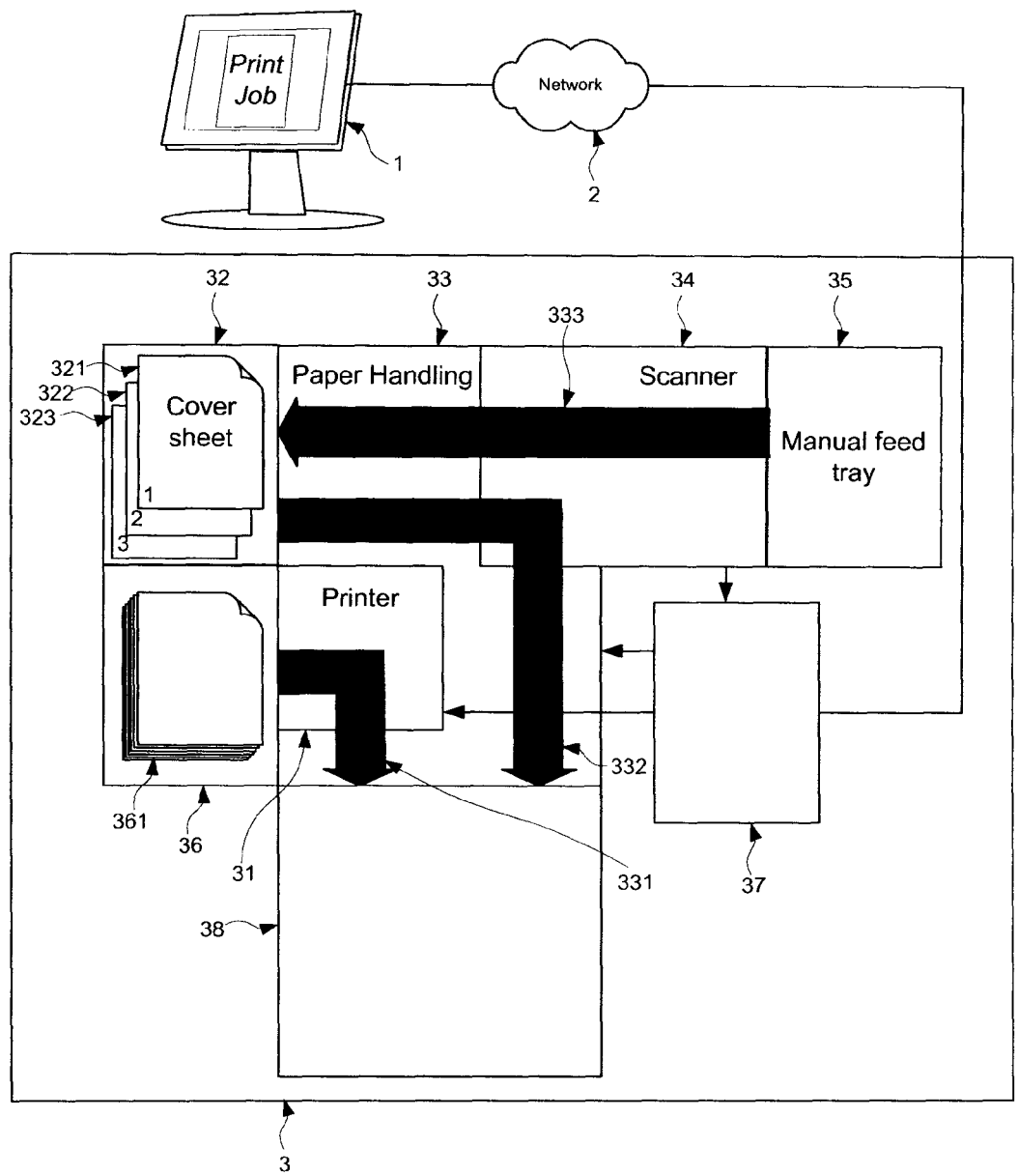
FIG. 5 shows details of the hardware configuration suitable for implementing a fourth embodiment of the invention.

FIG. 5 shows details of the hardware configuration suitable for implementing a fourth embodiment of the invention in an initial phase. In particular, as shown in FIG. 5 the printer 3 comprises an image formation unit 31, a second paper tray 36, paper handling mechanism 33, a scanner 34, a manual feed tray 35, a control unit 37 and an output tray 38 substantially as described above. As shown, the paper handling mechanism 33 is capable of conveying pages from the second paper tray 36 via the image forming unit 31 to the output tray 38 via paper flow path 331, and from the manual feed tray 35 via the scanner 34 to a waste outlet via paper flow path 333. Flow path 332 from the from the reusable print job addendum reservoir 32 to the output tray 38 differs from the flow described with respect to FIGS. 2*a* to 2*c*, in that the reusable print job addendum drawn from the reusable print job addendum reservoir 32 passes through the scanner 34 before reaching the output tray 38. Thereafter the invention may proceed substantially as described above. The fact that the reusable print job addendum passes through the scanner in this manner opens further possibilities in that there is no longer any requirement for the system to manage or track the content of the reusable print job addendum reservoir 32. The first available reusable print job addendum may be selected, for example from the top or bottom of a stack of reusable print job addenda in the reusable print job addendum reservoir 32. The reusable print job addendum thus retrieved is then scanned, and on the basis of the scanned information the system can identify the reusable print job addendum. The system may then report this information to the user as described above.

Figure 6:
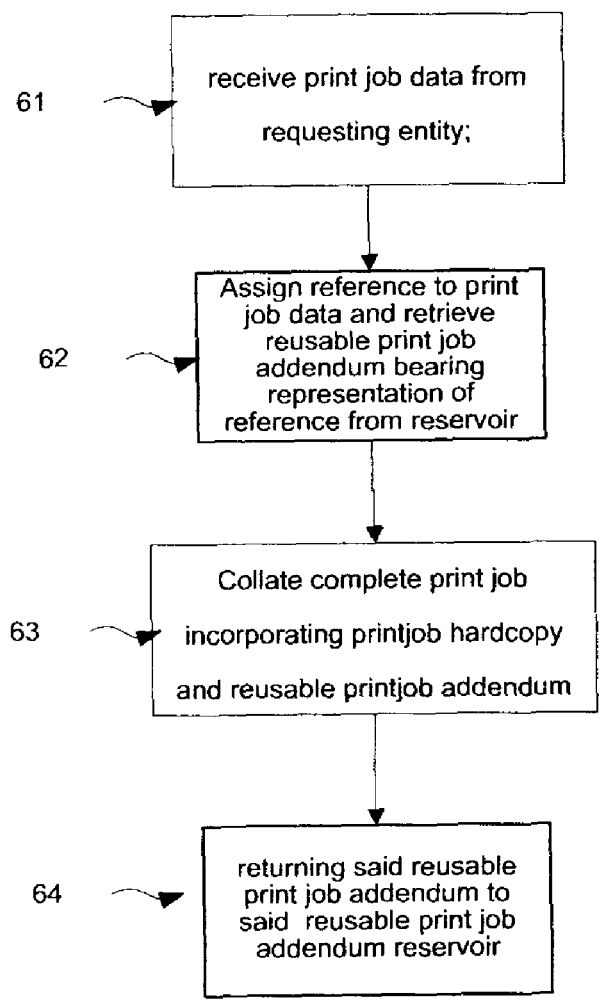
FIG. 6 shows the steps of a method corresponding to a realisation of any of the above described embodiments.

FIG. 6 shows the steps of a method corresponding to a realisation of any of the above described embodiments. As shown in FIG. 6 the first step 61 comprises receiving print job data from a requesting entity. At the next step 62 a reference is assigned to the print job data and a reusable print job addendum bearing representation of reference is retrieved from a reservoir. The method next proceeds to print a print job hardcopy and adding a reusable print job addendum incorporating a the representation of the reference at step 63, before returning said reusable print job addendum to said reusable print job addendum reservoir at step 64 on retrieval of the completed print job by a user.

Figure 7:
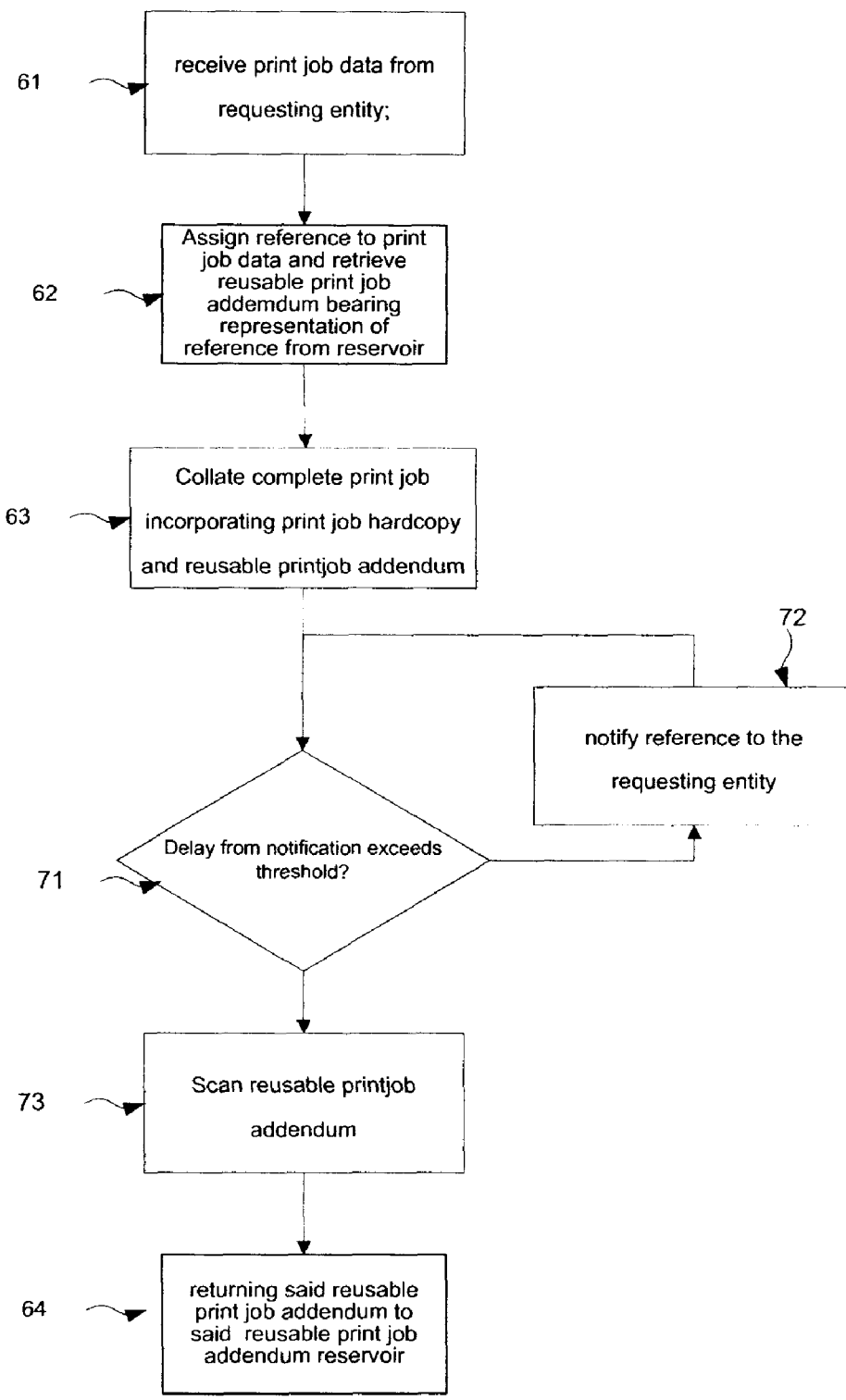
FIG. 7 shows the steps of a method corresponding to a realisation of the third embodiment.

FIG. 7 shows the steps of a method corresponding to a realisation of the third embodiment. The steps of FIG. 7 are identical to those of FIG. 6, with the exception that new steps 70 to 73 are interposed between steps 64 and 65 as described above. At step 71 at which it is determined whether a delay between the printing of the print job hardcopy and its recovery by the user exceeds a predetermined threshold as described above, and in a case where this is found to be the case, proceeding to step 72 of implementing a further notification as discussed above. At step 73 the reusable print job addendum of the reference is scanned at which point the print job hardcopy can be considered to have been retrieved and the delay need no longer be monitored, and the method proceeds to step 64 of returning said reusable print job addendum to said reusable print job addendum reservoir.

According to a further embodiment there is provided a method of processing a print job comprising the steps of: receiving a print job from a requesting entity; assigning a reference to said print job; printing said print job incorporating a visible representation of said reference; notifying said reference to the requesting entity; and optically scanning a reusable print job addendum.

According to a further embodiment print jobs received at a printer are assigned a reference which is incorporated as a visible representation of the reference in the printed print job. When the user recovers the print job, the reusable print job addendum is fed back into the printer, for reuse in later print jobs.

According to a further embodiment print jobs received at a printer are assigned a reference which is incorporated as a visible representation of the reference in the printed print job. When the user recovers the print job, the reusable print job addendum is scanned back into the printer, which is then able to read the visible representation. By monitoring the time intervening between the printing of the print job and the scanning of the reusable print job addendum, the system is able to monitor the delay, and in a case where this exceeds a threshold to notify the user accordingly.

The invention can take the form of an entirely hardware embodiment, an entirely software embodiment or an embodiment containing both hardware and software elements. It will in particular be appreciated that certain embodiments may be realised by means of entirely conventional printer hardware which may be modified by means of software or firmware modifications so as to implement those embodiments. In a preferred embodiment, the invention is implemented in software, which includes but is not limited to firmware, resident software, microcode, etc. Some or all features of the invention may be realised by means of software, firmware, machine code or the like, for example running in the control unit so as to cause the printer to carry out the printer 3 to carry out the various steps.

Furthermore, the invention can take the form of a computer program product accessible from a computer-usable or computer-readable medium providing program code for use by or in connection with a computer or any instruction execution system, for example a standalone computer controlling a printing system, or a processing part of a printer. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method of processing a print job comprising the steps of:
    receiving print job data defining a print job from a requesting entity;
    assigning a reference to said print job;
    retrieving a reusable print job addendum bearing a representation of said reference from a reusable print job addendum reservoir, printing a print job hardcopy from said print job data and adding said reusable print job addendum to said print job hardcopy to produce a completed print job, and returning said reusable print job addendum to said reusable print job addendum reservoir,
    scanning said reusable print job addendum so as to extract said reference represented thereon, after said step of incorporating said reusable print job addendum with said print job,
    monitoring a delay between said steps of printing said print job incorporating a representation of said reference and of scanning a reusable print job addendum, and in a case where said delay exceeds a predetermined threshold carrying out a further notification step.

2. The method of claim 1 wherein said further notification step comprises notifying said requesting entity.

3. The method of claim 1 wherein said further notification step comprises notifying a further entity.

4. The method of claim 1 comprising the further step of consulting reference data to identify the further entity predefined for said requesting entity.

* * * * *